(12) United States Patent
Yang

(10) Patent No.: US 11,462,931 B2
(45) Date of Patent: Oct. 4, 2022

(54) CHARGING METHOD AND CHARGING APPARATUS

(71) Applicant: GUANGDONG OPPO MOBILE TELECOMMUNICATIONS CORP., LTD., Guangdong (CN)

(72) Inventor: Xin Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 137 days.

(21) Appl. No.: 16/983,742

(22) Filed: Aug. 3, 2020

(65) Prior Publication Data
US 2020/0366116 A1    Nov. 19, 2020

Related U.S. Application Data

(63) Continuation of application No. PCT/CN2019/076555, filed on Feb. 28, 2019.

(51) Int. Cl.
| H02J 7/04 | (2006.01) |
| H02J 7/00 | (2006.01) |
| H02J 50/80 | (2016.01) |
| H02J 50/10 | (2016.01) |

(52) U.S. Cl.
CPC .......... H02J 7/007182 (2020.01); H02J 7/04 (2013.01); H02J 50/10 (2016.02); H02J 50/80 (2016.02)

(58) Field of Classification Search
None
See application file for complete search history.

(56) References Cited

U.S. PATENT DOCUMENTS

| 2007/0222416 A1* | 9/2007 | Sato .......................... H02J 7/04 320/128 |
| 2009/0309547 A1 | 12/2009 | Nakatsuji |
| 2015/0372523 A1 | 12/2015 | Chan |

FOREIGN PATENT DOCUMENTS

| CN | 1200204 | 11/1998 |
| CN | 1819398 | 8/2006 |
| CN | 102474124 | 5/2012 |
| CN | 104467095 | 3/2015 |
| CN | 105221942 | 1/2016 |
| CN | 106233565 | 12/2016 |
| CN | 107768757 | 3/2018 |
| JP | 2009022078 | 1/2009 |
| JP | 2009033843 | 2/2009 |

OTHER PUBLICATIONS

SIPO, First Office Action for CN Application No. 201980003852.7, dated Jan. 20, 2021.
WIPO, ISR for PCT/CN2019/076555, dated Apr. 28, 2019.
EPO, Extended European Search Report for EP Application No. 19916658.8, dated Oct. 15, 2021.

* cited by examiner

*Primary Examiner* — Arun C Williams
(74) *Attorney, Agent, or Firm* — Hodgson Russ LLP

(57) ABSTRACT

A charging method and a charging apparatus are provided. The method includes the following. A battery is charged in a constant current stage until a voltage of the battery reaches a first voltage, where the first voltage is a charging cut-off voltage corresponding to the constant current stage. When the voltage of the battery reaches the first voltage, the battery is charged in a constant voltage stage by applying a second voltage to the battery, where the second voltage is lower than the first voltage.

15 Claims, 7 Drawing Sheets

CHARGE A BATTERY IN A CONSTANT CURRENT STAGE UNTIL A VOLTAGE OF THE BATTERY REACHES A FIRST VOLTAGE, WHERE THE FIRST VOLTAGE IS A CHARGING CUT-OFF VOLTAGE CORRESPONDING TO A FIRST CONSTANT CURRENT STAGE — S201

CHARGE THE BATTERY IN A CONSTANT VOLTAGE STAGE BY APPLYING A SECOND VOLTAGE TO THE BATTERY IN RESPONSE TO THE VOLTAGE OF THE BATTERY REACHING THE FIRST VOLTAGE, WHERE THE SECOND VOLTAGE IS LOWER THAN THE FIRST VOLTAGE — S202

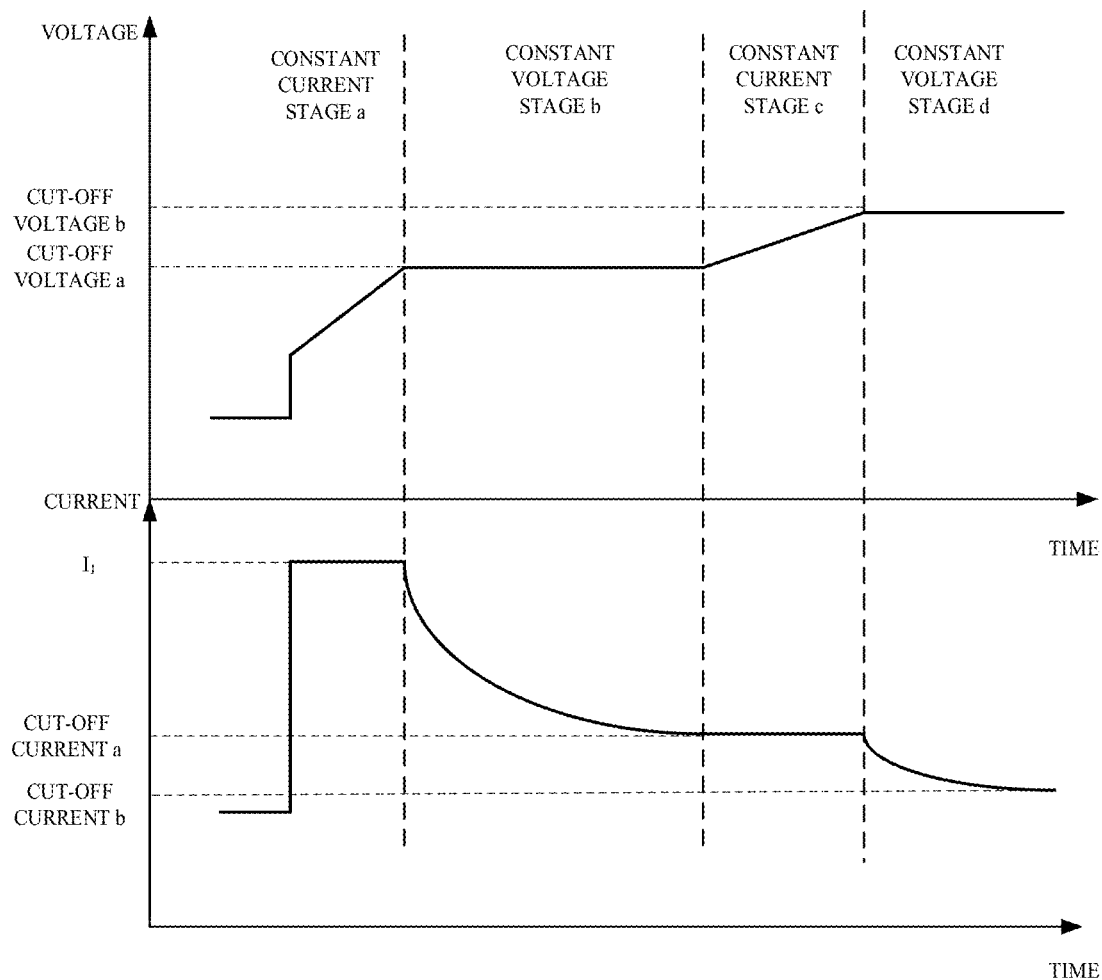

FIG. 1

CHARGE A BATTERY IN A CONSTANT CURRENT STAGE UNTIL A VOLTAGE OF THE BATTERY REACHES A FIRST VOLTAGE, WHERE THE FIRST VOLTAGE IS A CHARGING CUT-OFF VOLTAGE CORRESPONDING TO A FIRST CONSTANT CURRENT STAGE ~ S201

CHARGE THE BATTERY IN A CONSTANT VOLTAGE STAGE BY APPLYING A SECOND VOLTAGE TO THE BATTERY IN RESPONSE TO THE VOLTAGE OF THE BATTERY REACHING THE FIRST VOLTAGE, WHERE THE SECOND VOLTAGE IS LOWER THAN THE FIRST VOLTAGE ~ S202

FIG. 2

APPLY A FIRST CURRENT TO A BATTERY FOR CONSTANT CURRENT CHARGING IN A CONSTANT CURRENT STAGE OF A FIRST CONSTANT CURRENT-CONSTANT VOLTAGE STAGE, WHERE THE FIRST CURRENT IS LARGER THAN A RATED MAXIMUM CHARGING CURRENT OF THE BATTERY ∿ S410

US 11,462,931 B2

CHARGING METHOD AND CHARGING APPARATUS

CROSS REFERENCE TO RELATED APPLICATION(S)

This application is a continuation of International Application No. PCT/CN2019/076555, filed on Feb. 28, 2019, the entire disclosure of which is hereby incorporated by reference.

TECHNICAL FIELD

This disclosure relates to the field of charging, and more particularly to a charging method and a charging apparatus.

BACKGROUND

Currently, devices to-be-charged (such as smart phones) are becoming more popular with consumers. Nevertheless, the device to-be-charged needs to be charged frequently due to high power consumption.

The most commonly used charging mode is a constant voltage-constant current charging mode. In such a charging mode, although charging speed can be increased, charging with high voltage will last for a long time, which will adversely affect service life of the battery. Therefore, there is a need to shorten a duration for quick charging a battery with high voltage and reduce adversely affecting the battery.

SUMMARY

According to certain embodiments, a charging method and a charging apparatus are provided that provide for a shortening a duration for which a battery is charged with high voltage.

In a first aspect, a charging method is provided. The method can include the following. A battery can be charged in a constant current stage until a voltage of the battery reaches a first voltage, where the first voltage is a charging cut-off voltage corresponding to the constant current stage. When the voltage of the battery reaches the first voltage, the battery can be charged in a constant voltage stage by applying a second voltage to the battery, where the second voltage is lower than the first voltage.

In a second aspect, a charging method is provided. A charging process of a battery includes at least two constant current-constant voltage stages, each of the at least two constant current-constant voltage stages includes one constant current stage and one constant voltage stage, a charging current corresponding to a constant current stage of each of first N constant current-constant voltage stages is equal, and N is an integer greater than or equal to two. The method includes the following. The battery is charged in the constant current stage until a voltage of the battery reaches a first voltage, where the first voltage is a charging cut-off voltage corresponding to the constant current stage. In the constant voltage stage, when the voltage of the battery reaches the first voltage, a second voltage is applied to the battery for charging, where the second voltage is lower than or equal to the first voltage.

In a third aspect, a charging apparatus is provided. The charging apparatus includes a charging management circuit. The charging management circuit is configured to operate as follows. The charging management circuit is configured to charge a battery in a constant current stage until a voltage of the battery reaches a first voltage, where the first voltage is a charging cut-off voltage corresponding to the constant current stage. The charging management circuit is configured to charge the battery by applying, in a constant voltage stage, a second voltage to the battery when the voltage of the battery reaches the first voltage, where the second voltage is lower than the first voltage.

In a fourth aspect, a charging apparatus is provided. A charging process of a battery includes at least two constant current-constant voltage stages, each of the at least two constant current-constant voltage stages includes one constant current stage and one constant voltage stage, a charging current corresponding to a constant current stage of each of first N constant current-constant voltage stages is equal, and N is an integer greater than or equal to two. The charging apparatus includes a charging management circuit. The charging management circuit is configured to operate as follows. The charging management circuit is configured to charge the battery in the constant current stage until a voltage of the battery reaches a first voltage, where the first voltage is a charging cut-off voltage corresponding to the constant current stage. The charging management circuit is configured to charge the battery by applying, in the constant voltage stage, a second voltage to the battery when the voltage of the battery reaches the first voltage, where the second voltage is lower than or equal to the first voltage.

According to the technical solution provided herein, in a constant current-constant voltage charging mode, the charging cut-off voltage corresponding to the constant current stage is however not directly applied for charging in the constant voltage stage, and instead, a voltage lower than the charging cut-off voltage is applied for charging. In this way, a charging voltage applied in the constant voltage stage is low. On the other hand, the constant voltage stage can end before the voltage of the battery reaches the charging cut-off voltage. As such, a duration for constant voltage charging of the battery can be shortened, which is beneficial to prolonging service life of the battery.

BRIEF DESCRIPTION OF THE DRAWINGS

FIG. 1 is a schematic diagram of a constant current-constant voltage charging mode according to embodiments of the present application.

FIG. 2 is a schematic flowchart of a charging method according to embodiments of the present application.

DETAILED DESCRIPTION

Figures 3, 4:
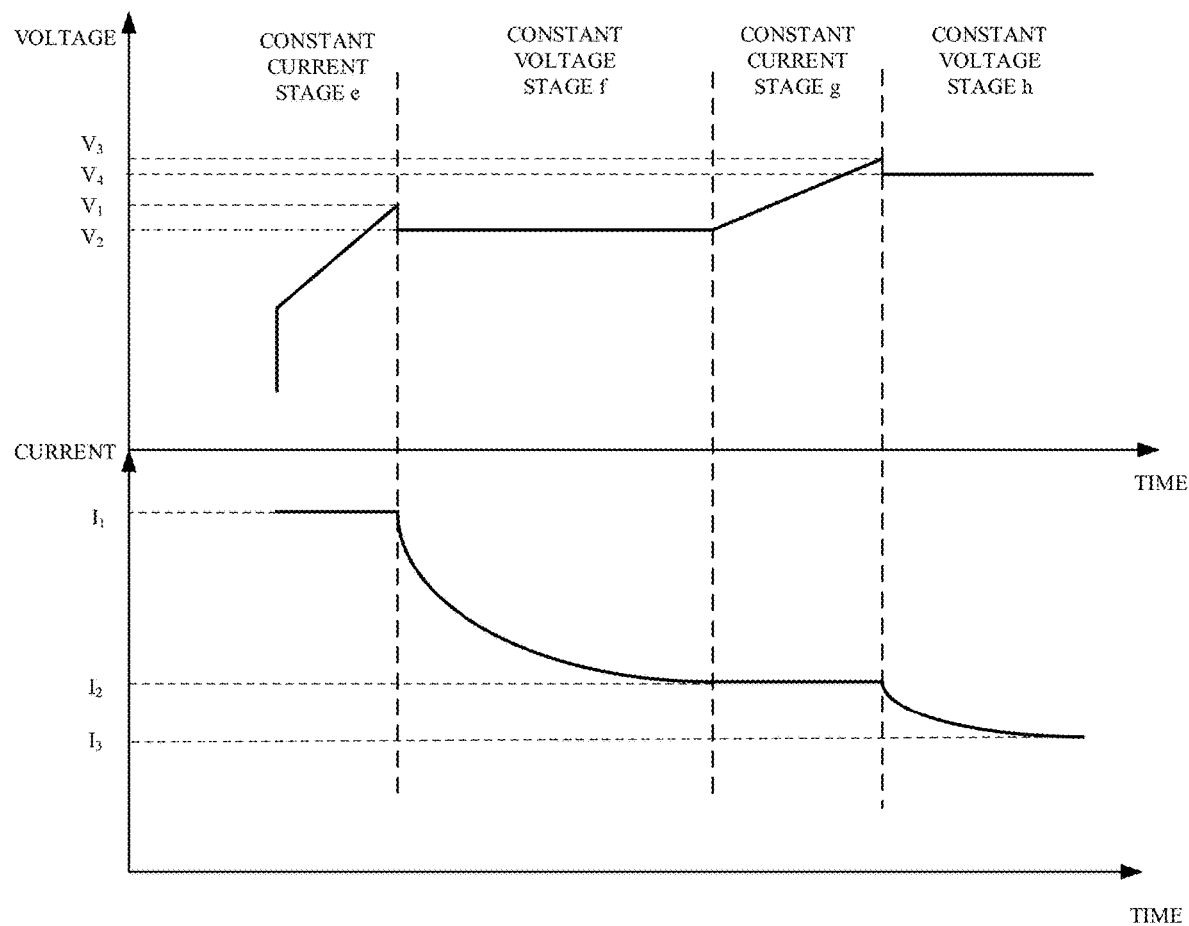
FIG. 3 is a schematic diagram of a constant current-constant voltage charging method according to embodiments of the present application.
FIG. 4 is a schematic flowchart of a charging method according to other embodiments of the present application.

With the continuous development of electronic devices, an increasing number of electronic devices need to be charged. With higher requirements of users on charging speed of the electronic device, a higher charging speed is desired to save charging time of the electronic device.

Currently, the most commonly used charging mode is a constant current-constant voltage (CCCV) charging mode. The constant current-constant voltage charging mode may include one constant current-constant voltage stage or include multiple constant current-constant voltage stages.

The constant current-constant voltage stage referred to herein may include one constant current stage and one constant voltage stage. In a constant current-constant voltage stage, a battery is charged in the constant current stage until a charging cut-off voltage corresponding to the constant current stage is reached. Then, the battery can be charged in a constant voltage stage until a charging cut-off current corresponding to the constant voltage stage is reached. This process then proceeds to a subsequent constant current-constant voltage stage.

For multiple constant current-constant voltage stages, a charging cut-off voltage can be set for each of multiple constant current stages and a charging cut-off current can be set for each of multiple constant voltage stages. The charging cut-off voltage corresponding to each of the multiple constant current stages may or may not be equal. The charging cut-off current corresponding to each of the multiple constant voltage stages may or may not be equal.

For one constant current-constant voltage stage, the charging process can be achieved as follows. As an example, in the constant current stage, a certain current is applied to the battery for constant current charging until a certain cut-off voltage is reached, and the cut-off voltage may be, for example, 4.2V (volt). Then the process can proceed to the constant voltage stage, and apply a cut-off voltage (such as 4.2V) for charging until a current of the battery decreases to a small value, such as the charging cut-off current (such as 0.01 C (coulomb)~0.1 C).

FIG. 1 is a schematic diagram of a charging process including two constant current-constant voltage stages. The two constant current-constant voltage stages are referred to as constant current-constant voltage stage M and constant current-constant voltage stage N respectively. Constant current-constant voltage stage M includes constant current stage a and constant voltage stage b. Constant current-constant voltage stage N includes constant current stage c and constant voltage stage d. Cut-off voltage a (such as $V_1$) can be set for constant current stage a, cut-off current b can be set for constant voltage stage b, cut-off voltage c can be set for constant current stage c, and cut-off current d can be set for constant voltage stage d.

When a voltage of the battery and/or a temperature of the battery satisfies a certain condition, the process can proceed to the constant current-constant voltage stage, such as constant current-constant voltage stage M. In constant current stage a, charging current $I_1$ is applied to the battery for charging. In constant current charging, the voltage of the battery can increase gradually. When the voltage of the battery reaches cut-off voltage a, the process can proceed to constant voltage stage b. In constant voltage stage b, cut-off voltage a is applied to the battery for constant voltage charging. In the constant voltage charging, the voltage of the battery can gradually approach cut-off voltage a, and a charging current applied to the battery decreases continuously. When the charging current applied to the battery decreases to cut-off current b, the process can proceed to the next constant current-constant voltage stage, that is, constant current-constant voltage stage N. The charging process of constant current-constant voltage stage N is similar to that of constant current-constant voltage stage M. For example, in constant current stage c, cut-off current b is applied to the battery for constant current charging, such that the voltage of the battery reaches cut-off voltage c, and then the process can proceed to constant voltage stage d. In constant voltage stage d, cut-off voltage c is applied to the battery for constant voltage charging, such that the charging current reaches cut-off current d.

In the constant current stage, when the charging current is large (such as 3 C), due to existence of an internal impedance of the battery, the battery can have a high float voltage, and a read cut-off voltage of the battery may be much higher than a real voltage across the battery. As a result, in the constant voltage stage, the battery needs to be charged until a voltage of the battery reaches the cut-off voltage from the real voltage across the battery, and constant voltage charging can last for a long time. Since high voltage is applied to the battery in constant voltage charging, during usage, if the battery is charged with high voltage for an excessively long time, the battery will be in a high voltage state for a long time, which can accelerate battery degradation and thus affect service life of the battery. Therefore, quick charging processes need to address the issue of shortening the duration of high voltage battery charging.

Therefore, according to embodiments of the present application a charging method is provided, which can improve service life of the battery while increasing charging speed.

The charging method according to embodiments can be applicable to a device to-be-charged for charging. The, "device to-be-charged" can include, but is not limited to, a device configured via a wired line and/or a wireless interface to receive/transmit communication signals. Examples of the wired line may include, but are not limited to, at least one of a public switched telephone network (PSTN), a digital subscriber line (DSL), a digital cable, a direct connection cable, and/or another data connection line or network connection line. Examples of the wireless interface may include, but are not limited to, a wireless interface with a cellular network, a wireless local area network (WLAN), a digital television network (such as a digital video broadcasting-handheld (DVB-H) network), a satellite network, an amplitude modulation-frequency modulation (AM-FM) broadcast transmitter, and/or with another communication terminal. A communication terminal configured to communicate via a wireless interface may be called a "wireless communication terminal", a "wireless terminal", and/or a "mobile terminal". Examples of a mobile terminal may include, but are not limited to, a satellite or cellular telephone, a personal communication system (PCS) terminal capable of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and/or other electronic devices equipped with radio telephone receiver such as a conventional laptop or a handheld receiver. The device to-be-charged may refer to a mobile terminal or a handheld terminal, such as a mobile phone or a pad. Alternatively, the device to-be-charged may refer to a system-on-chip, where the battery of the device to-be-charged may or may not belong to the system-on-chip.

In addition, the device to-be-charged can further include other electronic devices that need to be charged, such as the mobile phone, a power bank (such as a portable charger, a travel charger, etc.), an electro-mobile, a notebook computer, an unmanned aerial vehicle (UAV), a tablet computer, an e-reader, an e-cigarette, a smart electronic device, a small-sized electronic product, etc. The smart electronic device may include, for example, a smart watch, a smart bracelet, smart glasses, a robot mop, and the like. The small-sized electronic product may include, for example, a wireless headphone, a Bluetooth speaker, an electric toothbrush, a rechargeable wireless mouse, and the like.

As illustrated in FIG. 2, the charging method include operations at step S201 to step S202.

At step S201, a battery is charged in a constant current stage until a voltage of the battery reaches a first voltage, where the first voltage is a charging cut-off voltage corresponding to the constant current stage.

At step S202, when the voltage of the battery reaches the first voltage, the process can proceed to a constant voltage stage and apply a second voltage to the battery for charging, where the second voltage is lower than the first voltage.

The constant current stage and the constant voltage stage can be two continuous charging stages, and the constant current stage and the constant voltage stage may constitute one constant current-constant voltage stage.

As described above, in the constant current stage, due to the existence of battery impedance, a charging cut-off voltage corresponding to the constant current stage may be higher than a real voltage across the battery. A voltage difference between the charging cut-off voltage and the real voltage across the battery is referred to as a float voltage. A higher float voltage can lead to a longer charging time in the constant voltage stage.

According to embodiments of the technical solution provided herein, when a charging stage of the battery proceeds to a constant voltage stage from a constant current stage, a charging voltage corresponding to the constant voltage stage may however not be equal to the charging cut-off voltage corresponding to the constant current stage. Instead, a charging voltage corresponding to the constant voltage stage is lower than the charging cut-off voltage, that is, a voltage obtained by subtracting the float voltage from the charging cut-off voltage is applied for constant voltage charging. In this way, in the constant voltage stage, a low voltage can be applied for constant voltage charging, so as to shorten a duration for charging with high voltage. On the other hand, in the constant voltage stage, it may only be necessary to charge the battery until a voltage of the battery reaches a second voltage (e.g., the charging voltage corresponding to the constant voltage stage) from a first voltage (e.g., the real voltage across the battery) instead of charging the battery until the charging cut-off voltage corresponding to the constant current stage is reached from the first voltage. This may shorten a duration for constant voltage charging of the battery, slow down battery degradation, and therefore be beneficial to prolonging the service life of the battery.

A charging process of the battery can include one constant current-constant voltage stage. The constant current-constant voltage stage includes one constant current stage and one constant voltage stage described above.

The charging process of the battery can also include at least two preset constant current-constant voltage stages, and each of the at least two constant current-constant voltage stages includes one constant current stage and one constant voltage stage.

In the at least two preset constant current-constant voltage stages, for all constant voltage stages thereof, the voltage obtained by subtracting the float voltage from the charging cut-off voltage can be applied for constant voltage charging. Alternatively, for some constant voltage stages, the voltage obtained by subtracting the float voltage from the charging cut-off voltage can be applied for charging, and for each of the rest constant voltage stages, the charging voltage corresponding thereto can be equal to the charging cut-off voltage corresponding to the constant current stage.

For example, in the at least two preset constant current-constant voltage stages, for first several constant voltage stages thereof, the voltage obtained by subtracting the float voltage from the charging cut-off voltage can be applied for constant voltage charging, and for each of later constant voltage stages, since a charging current is small and thus the float voltage is low, the charging cut-off voltage corresponding to the constant current stage can be directly applied for charging.

With reference to FIG. 3, the charging process according to embodiments can include constant current-constant voltage stage X and constant current-constant voltage stage Y. Constant current-constant voltage stage X includes constant current stage e and constant voltage stage f Constant current-constant voltage stage Y includes constant current stage g and constant voltage stage h.

In constant current stage e, charging current $I_1$ can be applied to the battery for constant current charging. In the constant current charging, the voltage of the battery increases gradually. When the voltage of the battery reaches charging cut-off voltage $V_1$ corresponding to constant current stage e, the process can proceed to constant voltage stage f. In constant voltage stage f charging voltage $V_2$ is applied to the battery for charging, where $V_2<V_1$. When a charging current decreases to a charging cut-off current (such as $I_2$) corresponding to the constant voltage stage, the process can proceed to constant current-constant voltage stage Y.

In constant current stage g, charging current $I_2$ is applied to the battery for charging until the voltage of the battery reaches charging cut-off voltage $V_3$ corresponding to constant current stage g. When the voltage of the battery reaches charging cut-off voltage $V_3$, the process can proceed to constant voltage stage h. In constant voltage stage h, charging voltage $V_4$ is applied to the battery for constant voltage charging, where $V_4<V_3$.

For the at least two constant current-constant voltage stages, the manner in which a charging current corresponding to each of at least two constant current stages is set is not particularly restricted in embodiments.

In some embodiments, the at least two constant current-constant voltage stages can include a first constant current-constant voltage stage and a second constant current-constant voltage stage that are continuous, where the second constant current-constant voltage stage occurs after the first constant current-constant voltage stage, and a charging current corresponding to a constant current stage of the second constant current-constant voltage stage is equal to a charging cut-off current corresponding to a constant voltage stage of the first constant current-constant voltage stage.

For example, as illustrated in FIG. 3, charging current $I_2$ corresponding to constant current stage g can be equal to a charging cut-off current corresponding to constant voltage stage f. As such, the charging current varies continuously during charging, which can provide for continuity of charging current without step-like variation in current, and therefore increase charging speed.

In other examples, the at least two constant current-constant voltage stages include the first constant current-constant voltage stage and the second constant current-constant voltage stage. A charging current corresponding to a constant current stage of the first constant current-constant voltage stage is equal to a charging current corresponding to a constant current stage of the second constant current-constant voltage stage. In other words, different constant current stages can have an equal charging current, and such large charging current can be applied to the battery for constant current charging, which may increase charging speed.

In some embodiments, in the at least two constant current-constant voltage stages, a charging current corresponding to a constant current stage of each of first N constant current-constant voltage stages is equal, where N is an integer greater than or equal to two. For example, as illustrated in FIG. 3, charging current h corresponding to constant current stage e can be equal to a charging current corresponding to constant current stage g. In this way, a large charging current can be applied for charging in constant current stage g, which can increase charging speed in constant current stage g.

The above N constant current-constant voltage stages are set in advance. For example, N=2 or N=3, and accordingly a charging current corresponding to each of first two constant current stages or first three constant current stages is set to be equal. Alternatively, the N constant current-constant voltage stages are determined according to a capacity of the battery and/or the voltage of the battery. The value of N varies according to the charging process of the battery.

In an example, when the capacity of the battery is low, for example, the capacity of the battery is lower than a preset capacity, a charging current corresponding to each constant current stage is set to be equal. The preset capacity may be, for example, 80% or 85% of a rated capacity.

In another example, the charging current can also be determined according to the voltage of the battery. When the voltage of the battery is low, for example, the voltage of the battery is lower than a preset voltage, the charging current corresponding to each constant current stage is set to be equal. The preset voltage may be, for example, 3.8V, $4.0V_1$, 4.2V, etc.

A charging current corresponding to each of N constant current stages can be equal to a charging current corresponding to a first constant current stage. For example, the charging current corresponding to each of N constant current stages may be equal to a rated charging current of the battery.

For the at least two constant current-constant voltage stages, the manner in which a charging voltage corresponding to each of at least two constant voltage stages is set is not restricted to embodiments described herein.

In some embodiments, the at least two constant current-constant voltage stages include a third constant current-constant voltage stage and a fourth constant current-constant voltage stage, where the fourth constant current-constant voltage stage occurs after the third constant current-constant voltage stage. A voltage difference between a charging cut-off voltage corresponding to a constant current stage of the third constant current-constant voltage stage and a charging voltage corresponding to a constant voltage stage of the third constant current-constant voltage stage is $\Delta V_1$, and a voltage difference between a charging cut-off voltage corresponding to a constant current stage of the fourth constant current-constant voltage stage and a charging voltage corresponding to a constant voltage stage of the fourth constant current-constant voltage stage is $\Delta V_2$.

As an example, $\Delta V_1 = \Delta V_2$. That is, each of at least two constant voltage stage can have the same $\Delta V$.

In another example, $\Delta V_2 < \Delta V_1$. Since a charging current corresponding to a latter constant current stage is smaller than a charging current corresponding to a former constant current stage, a float voltage generated in the latter constant current stage can be lower than a float voltage generated in the former constant current stage. Therefore, $\Delta V$ in a latter constant voltage stage is set to be smaller than $\Delta V$ in a former constant voltage stage to match charging of the battery.

Still take FIG. 3 as an example. Since charging current $I_2$ corresponding to constant current stage g is smaller than charging current $I_1$ corresponding to constant current stage e, a float voltage generated in constant current stage g is lower than a float voltage generated in constant current stage e. Therefore, $(V_3-V_4)$ in constant voltage stage h is smaller than $(V_1-V_2)$ in constant voltage stage f.

The manner in which the charging voltage corresponding to each of the at least two constant voltage stages is set can also be a combination of the above. For example, $\Delta V$ in each of former p constant voltage stages of the at least two constant voltage stages can be equal, $\Delta V$ in each of latter q constant voltage stages of the at least two constant voltage stages is equal, and $\Delta V$ in each of the former p constant voltage stages is larger than $\Delta V$ in each of the latter q constant voltage stages, where p and q are integers greater than or equal to one.

In an example, $V_3-V_4=0$. In other words, a charging cut-off voltage corresponding to constant current stage g can also be used as a charging voltage of constant voltage stage h to be applied for charging, that is, the charging voltage of constant voltage stage h can be equal to $V_3$.

In the constant current stage, the first voltage can be higher than a rated voltage of the battery. In other words, in the constant current stage, the battery can be charged until the voltage of the battery is higher than the rated voltage. In this way, it is possible to provide more power to the battery in the constant current stage, which can shorten the duration of constant voltage charging of the battery in the subsequent constant voltage stage.

The charging voltage corresponding to the constant voltage stage may be the rated voltage of the battery. After the constant current stage, the rated voltage of the battery can be applied to the battery for constant voltage charging. Since in the constant current stage, the battery can be charged until a voltage higher than the rated voltage is reached, the charging cut-off current corresponding to the constant voltage stage can be determined according to a rated capacity of the battery. Therefore, the duration of constant voltage charging can be shortened, and accordingly the charging cut-off current corresponding to the constant voltage stage can be large. The charging cut-off current corresponding to the constant voltage stage can be larger than a common constant-voltage cut-off charging current $I_a$. If $I_a$ is 0.01 C~0.1

C, the charging cut-off current corresponding to the constant voltage stage can be larger than 0.01 C~0.1 C.

As the time for constant voltage charging becomes shorter, charging speed of the battery can be further increased.

In some embodiments, the constant current stage is a constant current stage of a last constant current-constant voltage stage in the at least two preset constant current-constant voltage stages. In the constant current stage of the last constant current-constant voltage stage, the battery can be charged until the voltage of the battery is higher than the rated voltage. As such, a larger charging cut-off current can be set for the last constant voltage stage, and therefore the battery can be fully charged in a shorter time, which can increase the charging speed.

As illustrated in FIG. 3, for example, if constant current-constant voltage stage Y is the last constant current-constant voltage stage in the at least two constant current-constant voltage stages, charging cut-off voltage $V_3$ corresponding to constant current stage g can be higher than the rated voltage of the battery, a charging voltage corresponding to constant voltage stage h can be equal to the rated voltage of the battery, and charging cut-off current $I_3$ corresponding to constant voltage stage h can be larger than $I_a$, for example, $I_3 > I_a$.

Alternatively, a charging cut-off voltage corresponding to a constant current stage of each of the at least two constant current-constant voltage stages is higher than the rated voltage of the battery, or charging cut-off currents corresponding to some constant current stages are higher than the rated voltage of the battery.

The manner in which charging cut-off voltages corresponding to different constant current stages are set is not restricted in embodiments.

As an example, the charging cut-off voltages corresponding to different constant current stages are equal. Take FIG. 3 as an example. A charging cut-off voltage corresponding to constant current stage e can be equal to a charging cut-off voltage corresponding to constant current stage g. For example, for each constant current stage, the charging cut-off voltage corresponding thereto may be the rated voltage of the battery, or may be a threshold voltage higher than the rated voltage of the battery.

As another example, different constant current stages have different charging cut-off voltages. If a charging process of the battery includes a first constant current-constant voltage stage and a second constant current-constant voltage stage and the second constant current-constant voltage stage occurs after the first constant current-constant voltage stage, a charging cut-off voltage corresponding to a constant current stage of the second constant current-constant voltage stage can be higher than a charging cut-off voltage corresponding to a constant current stage of the first constant current-constant voltage stage. In other words, a charging cut-off voltage corresponding to a latter constant current stage can be higher than a charging cut-off voltage corresponding to a former constant current stage.

The manner in which the charging cut-off voltage corresponding to the constant current stage is set can also be a combination of the above. For example, first several constant current stages each have a different charging cut-off voltage, and later constant current stages have the same charging cut-off voltage.

For the last constant current-constant voltage stage, a charging cut-off voltage corresponding to a constant current stage of the last constant current-constant voltage stage can be determined according to the configuration of the battery, for example, the maximum voltage that the battery can withstand.

In some embodiments, a charging current $I_c$ corresponding to the constant current stage is larger than a rated maximum charging current of the battery. Charging current $I_c$ may refer to a rated delivery current of the battery and may be, for example, 3 C.

In some embodiments, the constant current stage is a constant current stage of the first constant current-constant voltage stage in the at least two constant current-constant voltage stages.

In other words, in an initial constant current stage, a current larger than charging current $I_c$ can be applied to the battery for constant current charging, for example, a current larger than 3 C can be applied for charging. Since the charging current is large, charging speed can be increased.

A charging time in which charging current $I_c$ is applied for constant current charging can be short, which is possible to ensure safety of charging and control generation of battery heat.

In the following, embodiments will be elaborated in connection with specific charging cut-off voltages and charging cut-off currents. However, the specific values given below are for illustrative purpose only and do not limit the disclosure.

Before proceeding to constant current-constant voltage charging, the voltage of the battery and/or a temperature of the device to-be-charged can be first detected. The process can proceed to a constant current-constant voltage stage only when the voltage of the battery and/or the temperature of the device to-be-charged satisfies preset conditions. For example, the process can proceed to the constant current-constant voltage stage when the voltage of the battery is 2.5V~4.2V or the temperature of the device to-be-charged is 16° C.~41° C.

(1) After proceeding to the constant current-constant voltage stage, a current of 3 C is applied to the battery for charging. The voltage of the battery increases gradually during charging until 3.8V (that is, a charging cut-off voltage of this stage) is reached, and then the process can proceed to a constant voltage stage.

(2) In the constant voltage stage, a charging voltage of 3.4V (or 3.2V) is applied to the battery for constant voltage charging. A charging current applied to the battery decreases gradually during charging until the charging current decreases to 2 C, that is, a charging cut-off current of this stage, and then the process can proceed to a next constant current-constant voltage stage.

(3) In a constant current stage of the next constant current-constant voltage stage, a charging current of 2 C is applied to the battery for constant current charging. The voltage of the battery increases gradually during charging until 4.0V (that is, a charging cut-off voltage of this stage) is reached, and then the process can proceed to a constant voltage stage.

(4) In the constant voltage stage, a charging voltage of 3.8V is applied to the battery for constant voltage charging. The charging current applied to the battery decreases gradually during charging until the charging current decreases to 1 C, that is, a charging cut-off current of this stage, and then the process can proceed to a next constant current-constant voltage stage.

(5) The above constant current-constant voltage charging process can be repeated. The number of times of repetition can be determined according to actual need.

(6) In the last constant current-constant voltage stage, in a constant current stage thereof, charging current $I_n$ is applied for charging until the voltage of the battery reaches $V_b$, and then the process can proceed to a constant voltage stage, where charging voltage $V_b$ is a charging cut-off voltage corresponding to this constant current stage, and charging voltage $V_b$ is higher than the rated voltage of the battery.

(7) In the constant voltage stage, the rated voltage of the battery is applied to the battery for charging until the charging current applied to the battery reaches a charging cut-off current corresponding to this stage, where the charging cut-off current may be larger than a common constant-voltage cut-off charging current $I_a$, and $I_a$ may be, for example, 0.01 C~0.1 C.

According to the technical solution provided herein, a charging voltage in a constant voltage charging stage is low. On the other hand, by decreasing the charging voltage in the constant voltage charging stage, a duration for the constant voltage charging stage can be shortened, which can slow down battery degradation and thus is beneficial to prolonging the service life of the battery. In addition, the charging current corresponding to the constant current stage can be equal to the charging cut-off current corresponding to the constant voltage stage. As such, the charging current does not change significantly, which can ensure continuity of current and therefore can increase charging speed of the battery.

When the last constant current-constant voltage stage ends, it can indicate that charging is completed, the battery is fully charged, and the charging process can be ended. Alternatively, the charging process can also include another charging stage(s), and in this case, the process can proceed to this charging stage to charge the battery.

In some embodiments, the constant voltage stage is a constant voltage stage of the last constant current-constant voltage stage in the at least two constant current-constant voltage stages. When the charging current applied to the battery reaches the charging cut-off current corresponding to the constant voltage stage, it indicates that the battery is fully charged, and at this time, the charging process can be ended. The charging cut-off current corresponding to the constant voltage stage can be a minimum charging current of the battery, or be determined by the rated capacity of the battery. That is, the minimum charging current can be a charging current applied to the battery when the rated capacity of the battery is reached.

In other embodiments, a charging time corresponding to a last constant voltage stage can be set. The constant voltage stage is the last constant voltage stage. When a charging time for the constant voltage stage reaches a preset charging time, it can indicate that the battery is fully charged and the charging process can be ended.

Embodiments further provide a charging method that can increase charging speed of the battery. As illustrated in FIG. 4, the charging process of the battery includes at least two constant current-constant voltage stages. The method includes operations at step S410.

At step S410, a first current is applied to the battery for constant current charging in a constant current stage of a first constant current-constant voltage stage, where the first current is larger than the rated maximum charging current of the battery.

In embodiments of the charging method described herein, a conventional constant current-constant voltage charging process can continue to be adopted, that is, the charging voltage corresponding to the constant voltage stage can be equal to the charging cut-off voltage corresponding to the constant current stage. The difference lies in that in the at least two constant current-constant voltage stages, a charging current corresponding to the constant current stage of the first constant current-constant voltage stage can be larger than the rated maximum charging current of the battery. Since a charging current in a first constant current stage is large, charging speed can be high, which can allow for an increase in overall charging speed of the battery.

In addition, a constant voltage charging manner in which a voltage obtained by subtracting the float voltage from the charging cut-off voltage is applied can also be adopted. As such, charging time for the constant voltage stage can be shortened. On the other hand, since a low voltage is applied for constant voltage charging, it is beneficial to prolonging the service life of the battery.

In some embodiments, the method includes the following. The battery is charged in the constant current stage until a voltage of the battery reaches a first voltage, where the first voltage is a charging cut-off voltage corresponding to the constant current stage. When the voltage of the battery reaches the first voltage, the process can proceed to the constant voltage stage and apply a second voltage to the battery for charging, where the second voltage is lower than the first voltage.

For details not described in the above charging method, reference can be made to the foregoing method embodiments.

Figure 5:
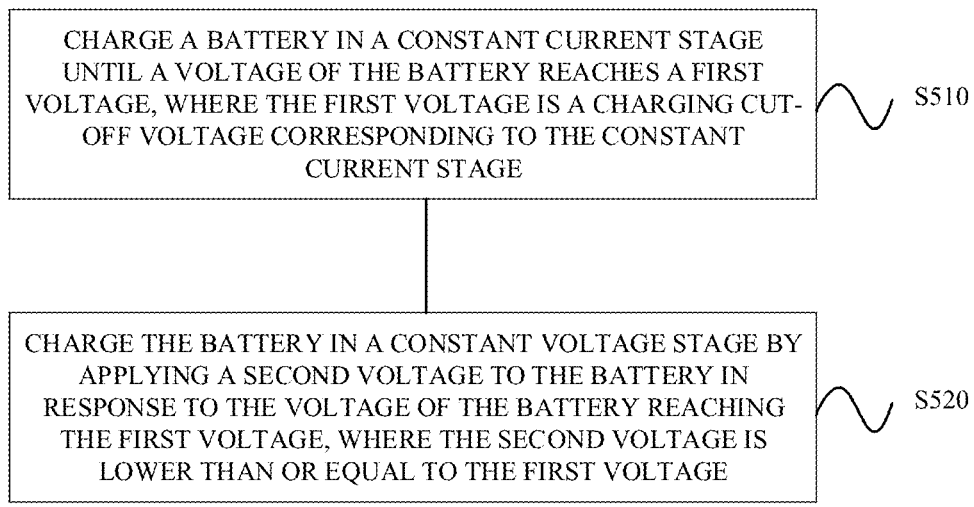
FIG. 5 is a schematic flowchart of a charging method according to other embodiments of the present application.

Embodiments further provide another charging method that can increase charging speed of the battery. As illustrated in FIG. 5, the charging process of the battery includes at least two constant current-constant voltage stages, where all constant current stages of first N constant current-constant voltage stages have the same charging current, and N is an integer greater than or equal to two. The method includes operations at step S510 and step S520.

At step S510, the battery is charged in a constant current stage until a voltage of the battery reaches a first voltage, where the first voltage is a charging cut-off voltage corresponding to the constant current stage.

At step S520, when the voltage of the battery reaches the first voltage, the process can proceed to a constant voltage stage where the battery is charged by applying a second voltage to the battery. The second voltage is lower than or equal to the first voltage.

The method illustrated in FIG. 5 can be combined with the method illustrated in FIG. 4. For example, the charging process of the battery can include at least two constant current-constant voltage stages. In the constant current stage of the first constant current-constant voltage stage, a current larger than the rated maximum charging current of the battery is applied for constant-current charging. In each of subsequent N constant current-constant voltage stages, a charging current corresponding to each of N constant current stages can be equal, for example, the charging current corresponding to each of the N constant current stages can be 3 C. Since a charging current applied to the battery in the constant current stage is large, charging speed can be increased.

In the method illustrated in FIG. 5, the second voltage can be higher than the first voltage. This disclosure is not limited in this regard.

The charging method according to embodiments is applicable to different electronic devices. For different electronic devices, the charging current and the charging cut-off voltage corresponding to the constant current stage as well as the charging voltage and the charging cut-off current corresponding to the constant voltage stage can be adaptively adjusted.

In the following, a charging apparatus according to embodiments will be described with reference to FIGS. 6-14. It should be understood that features in method embodiments are also applicable to apparatus embodiments. Apparatus embodiments and method embodiments correspond to each other. Therefore, for details not described in apparatus embodiments, reference can be made to the foregoing method embodiments.

Figure 6:
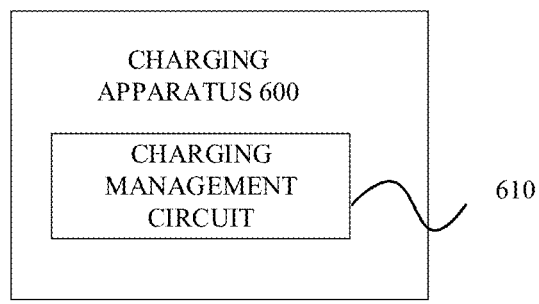
FIG. 6 is a schematic structural diagram of a charging apparatus according to embodiments of the present application.

A charging apparatus illustrated in FIG. 6 can include a charging management circuit 610. The charging management circuit 610 is configured to charge a battery in a constant current stage until a voltage of the battery reaches a first voltage, where the first voltage is a charging cut-off voltage corresponding to the constant current stage. The charging management circuit 610 is further configured to proceed to a constant voltage stage and apply a second voltage to the battery for charging when the voltage of the battery reaches the first voltage, where the second voltage is lower than the first voltage.

In some embodiments, a charging process of the battery includes at least two constant current-constant voltage stages, and each of the at least two constant current-constant voltage stages includes one constant current stage and one constant voltage stage.

In some embodiments, the at least two constant current-constant voltage stages include a first constant current-constant voltage stage and a second constant current-constant voltage stage which can be continuous, and a charging current corresponding to a constant current stage of the second constant current-constant voltage stage can be equal to a charging cut-off current corresponding to a constant voltage stage of the first constant current-constant voltage stage.

In some embodiments, in the at least two constant current-constant voltage stages, a charging current corresponding to a constant current stage of each of first N constant current-constant voltage stages is equal, where N is an integer greater than or equal to two.

In some embodiments, the at least two constant current-constant voltage stages include a third constant current-constant voltage stage and a fourth constant current-constant voltage stage, the fourth constant current-constant voltage stage occurs after the third constant current-constant voltage stage, a voltage difference between a charging cut-off voltage corresponding to a constant current stage of the third constant current-constant voltage stage and a charging voltage corresponding to a constant voltage stage of the third constant current-constant voltage stage is $\Delta V_1$, and a voltage difference between a charging cut-off voltage corresponding to a constant current stage of the fourth constant current-constant voltage stage and a charging voltage corresponding to a constant voltage stage of the fourth constant current-constant voltage stage is $\Delta V_2$, where $\Delta V_1 > \Delta V_2$.

In some embodiments, a charging cut-off voltage corresponding to the constant current stage is higher than a rated voltage of the battery.

In some embodiments, the constant current stage is a constant current stage of a last constant current-constant voltage stage in the at least two constant current-constant voltage stages.

In some embodiments, a charging current corresponding to the constant current stage is larger than a rated maximum charging current of the battery.

In some embodiments, the constant current stage is a constant current stage of a first constant current-constant voltage stage in the at least two constant current-constant voltage stages.

Figure 7:
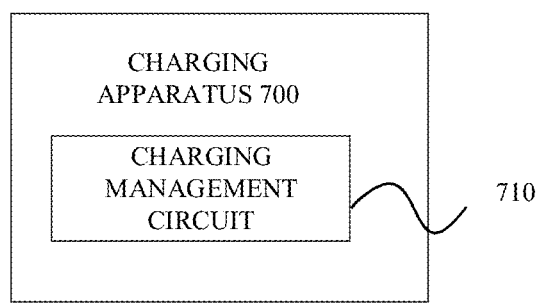
FIG. 7 is a schematic structural diagram of a charging apparatus according to other embodiments of the present application.

A charging apparatus 700 illustrated in FIG. 7 is configured to charge a battery. A charging process of the battery includes at least two constant current-constant voltage stages. The charging apparatus 700 includes a charging management circuit 710. The charging management circuit 710 is configured to apply a first current to the battery for constant current charging in a constant current stage of a first constant current-constant voltage stage, where the first current is larger than a rated maximum charging current of the battery.

In the charging apparatus provided herein, a current larger than the rated maximum charging current can be applied to the battery for charging in a first constant current stage, which is possible to increase charging speed.

Figure 8:
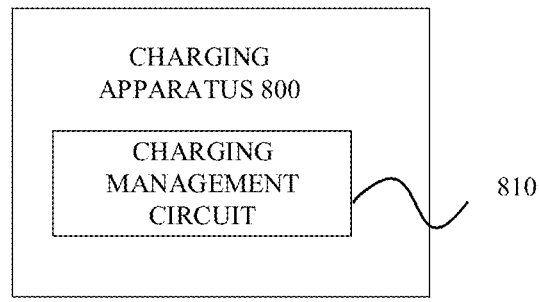
FIG. 8 is a schematic structural diagram of a charging apparatus according to other embodiments of the present application.

A charging apparatus 800 illustrated in FIG. 8 is configured to charge a battery. A charging process of the battery includes at least two constant current-constant voltage stages, each of the at least two constant current-constant voltage stages includes one constant current stage and one constant voltage stage, a charging current corresponding to a constant current stage of each of first N constant current-constant voltage stages is equal, and N is an integer greater than or equal to two.

The charging apparatus 800 includes a charging management circuit 810. The charging management circuit 810 can be configured to operate as follows. The charging management circuit 810 can be configured to charge the battery in the constant current stage until a voltage of the battery reaches a first voltage, where the first voltage is a charging cut-off voltage corresponding to the constant current stage. The charging management circuit 810 can be configured to apply a second voltage to the battery for charging in the constant voltage stage when the voltage of the battery reaches the first voltage, where the second voltage is lower than or equal to the first voltage.

In some embodiments, constant current-constant voltage stages of the at least two constant current-constant voltage stages other than the first N constant current-constant voltage stages include a first constant current-constant voltage stage and a second constant current-constant voltage stage which are continuous, and a charging current corresponding to a constant current stage of the second constant current-constant voltage stage is equal to a charging cut-off current corresponding to a constant voltage stage of the first constant current-constant voltage stage.

The battery according to embodiments can include one cell or M cells coupled in series (where M is a positive integer greater than one). As an example, M=2, and in this case, the battery includes a first cell and a second cell, and the first cell and the second cell are coupled in series.

Compared with a scheme in which the battery includes one single cell, to reach an equal charging speed, a charging current required by multiple cells is 1/M of a charging current required by one single cell. Similarly, if the same charging current applied for charging, a charging speed of multiple cells is M times that of one single cell. Therefore, if the charging current applied for charging is the same, by adopting multiple cells, charging speed of the battery can be greatly improved.

The multiple cells according to embodiments can be cells with the same or similar specification or parameter. Cells with the same or similar specification can be easy to manage. Meanwhile, the overall performance and service life of the multiple cells composed of cells with the same or similar specification or parameter can be improved. Alternatively, the multiple cells may have different specifications and parameters. In this case, a balancing circuit can be used to balance a voltage across each of the multiple cells during charging and/or power supply.

Even when the multiple cells have the same or similar specification and parameter, the voltage across each of the multiple cells may also be unequal. In this situation, the balancing circuit can also be used for balancing of the voltage across each of the multiple cells.

For a device to-be-charged including multiple cells, during power supply, the voltage across each of the multiple cells can be decreased by a buck circuit to supply power for a system of the device to-be-charged. Alternatively, a single cell can be used to supply power for the system. In addition, during charging, a path can be set separately for powering the system if necessary.

To keep balance of an electric quantity of each of the multiple cells, the balancing circuit can be used for balancing the electric quantity of each of the multiple cells during charging and discharging. The balancing circuit can be implemented in various manners. For example, a load can be coupled with both ends of a cell to consume electric quantity of the cell, such that the electric quantity of the cell is equal to that of other cells and as such, the voltage of each of the multiple cells is equal. Alternatively, for balancing, a cell with high electric quantity can be set to charge a cell with low electric quantity until the voltage of each of the multiple cells is equal. In another example, the balancing circuit may be a Cuk circuit. In another example, the balancing circuit may be a balancing circuit based on an RLC series circuit or a buck-boost based balancing circuit.

According to embodiments described herein, when the battery includes multiple cells, in the constant current stage, it may be necessary to monitor whether the voltage across each of the multiple cells reaches the charging cut-off voltage corresponding to the constant current stage. If a voltage across any one of the multiple cells reaches the charging cut-off voltage, the process can proceed to the constant voltage stage. Alternatively, a charging path of a cell of which the voltage has reached the charging cut-off voltage can be cut off, and other cells of the battery can continue to be charged until the voltage across each of the multiple cells reaches the charging cut off voltage, then the process can proceed to the constant voltage stage.

Embodiments of the present disclosure can be applicable to a wired charging process or a wireless charging process, which is not limited herein.

Hereinafter, a wired charging process will be described with reference to FIG. 9 and FIG. 10.

Figure 9:
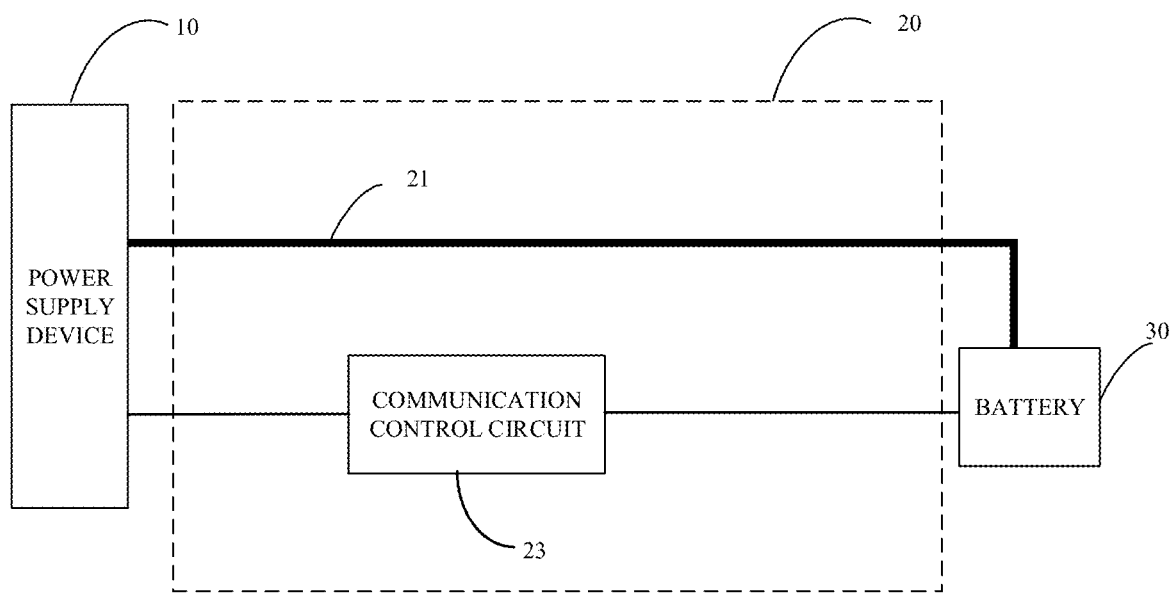
FIG. 9 is a schematic structural diagram of a wired charging system according to embodiments of the present application.
Figure 10:
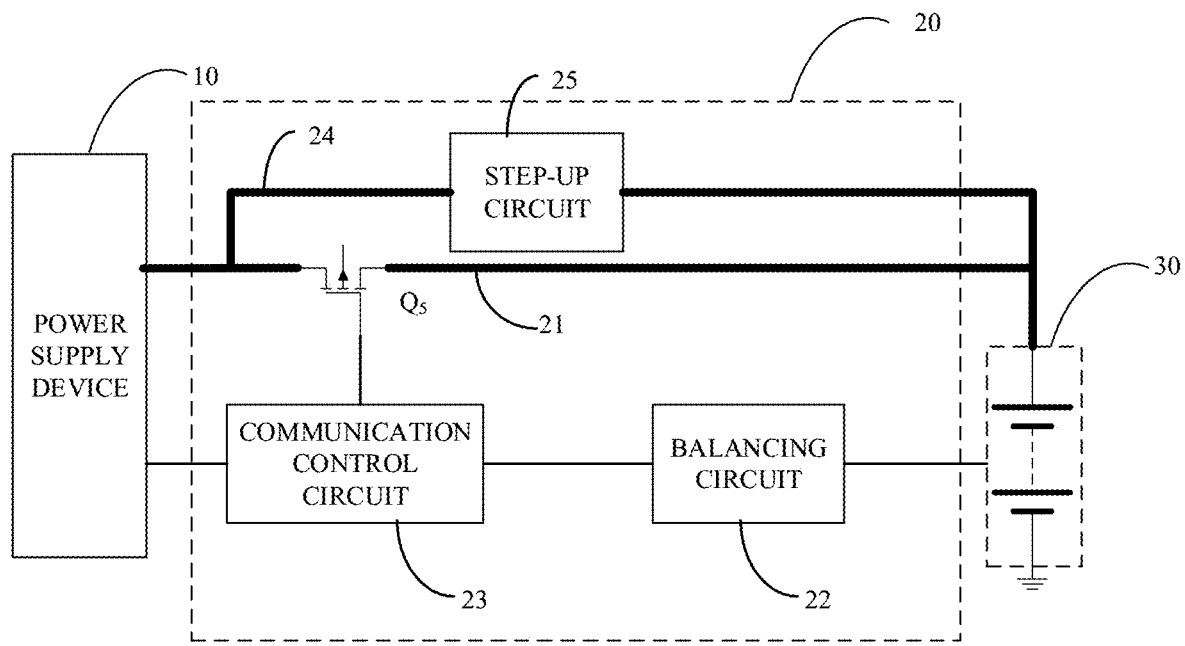
FIG. 10 is a schematic structural diagram of a wired charging system according to other embodiments of the present application.

FIG. 9 is a schematic structural diagram of a charging system according to embodiments of the present disclosure. The charging system includes a power supply device 10, a battery management circuit 20, and a battery 30. The battery management circuit 20 is configured to manage the battery 30. The battery management circuit 20 can be the charging management circuit described in the foregoing embodiments, and can be configured to manage a charging process of the battery.

As an example, the battery management circuit 20 can manage a charging process of the battery 30, such as selecting a charging channel, controlling a charging voltage and/or a charging current, etc. As another example, the battery management circuit 20 can manage cells in the battery 30, such as balancing a voltage across each cell in the battery 30.

The battery management circuit 20 can include a first charging channel 21 and a communication control circuit 23.

Through the first charging channel 21, a charging voltage and/or a charging current provided by the power supply device 10 is received to be applied to the battery 30 for charging.

The first charging channel 21 may be, for example, a wire, or may be provided with other circuit components unrelated to conversion of the charging voltage and/or the charging current. For example, the battery management circuit 20 includes the first charging channel 21 and a second charging channel, where the first charging channel 21 is provided with a switch component for switching between different charging channels (for specific details, reference can be made to description of FIG. 10).

The power supply device 10 can be a power supply device of which an output voltage is adjustable, but there is no specific restriction on the type of the power supply device 10 in embodiments. For example, the power supply device 10 may be a specialized device for charging such as an adaptor, a power bank, or may be other devices such as a computer which can both supply power and provide data service.

The first charging channel 21 can be a direct-charging channel, through which the charging voltage and/or the charging current provided by the power supply device 10 can be directly applied to the battery 30. To achieve direct charging, a control circuit with a communication function (e.g., communication control circuit 23) can be introduced to the battery management circuit 20. The communication control circuit 23 can communicate with the power supply device 10 during direct charging to form a closed-loop feedback mechanism, such that the power supply device 10 can acquire, in real time, a state of the battery to continuously adjust a charging voltage and/or a charging current provided to the first charging channel, such that the charging voltage and/or the charging current provided by the power supply device 10 can match a present charging stage of the battery 30.

For example, when a voltage of the battery 30 reaches a charging cut-off voltage corresponding to a constant current stage, the communication control circuit 23 can communicate with the power supply device 10 such that charging of the battery 30 by the power supply device 10 switches to constant voltage charging from constant current charging. In another example, when a charging current applied to the battery 30 reaches a charging cut-off current corresponding to a constant voltage stage, the communication control circuit 23 can communicate with the power supply device 10 such that charging of the battery 30 by the power supply device 10 switches to constant current charging from constant voltage charging.

The battery management circuit provided herein can perform direct charging on the battery. In other words, the battery management circuit provided herein can be operable with a direct charging architecture. In the direct charging architecture, no converting circuit is needed for the direct-charging channel, which is possible to reduce heating of a device to-be-charged during charging. In an example illustrated in FIG. 10, the battery management circuit 20 further includes a second charging channel 24. The second charging channel 24 is provided with a step-up circuit 25. When the power supply device 10 charges the battery 30 through the second charging channel 24, the step-up circuit 25 is configured to receive an initial voltage provided by the power supply device 10 and boost the initial voltage to a target voltage to be applied to the battery 30 for charging, where the initial voltage is lower than an overall voltage of the battery 30, and the target voltage is higher than the overall voltage of the battery 30. The communication control circuit 23 can be further configured to control switching between the first charging channel 21 and the second charging channel 24.

When the battery 30 includes multiple cells, the second charging channel 24 can be compatible with a common power supply device for charging of the battery 30, such that a common power supply device can charge a battery including multiple cells.

For the battery 30 including multiple cells, the battery management circuit 20 can further include a balancing circuit 22. For details on the balancing circuit 22 not described herein, reference can be made to the description above. The balancing circuit 22 can be configured to balance a voltage across each of the multiple cells in charging and/or discharging of the battery.

The manner in which the step-up circuit 25 is implemented is not limited in embodiments. For example, the step-up circuit 25 may be implemented as a boost circuit or may be implemented as a charge pump. In an example, the second charging channel 24 can be provided with a converting circuit (such as a charging integrated circuit (IC)). The converting circuit can perform constant voltage control and constant current control on charging of the battery 30 and adjust, according to actual needs, the initial voltage provided by the power supply device 10, such as increasing voltage or decreasing voltage. By utilizing a boost function of the converting circuit, the initial voltage provided by the power supply device 10 can be boosted to the target voltage.

The communication control circuit 23 can control switching between the first charging channel 21 and the second charging channel 24 through a switch component. As illustrated in FIG. 10, the first charging channel 21 can be provided with switch transistor $Q_5$. When the communication control circuit 23 controls switch transistor $Q_5$ to be switched on, the first charging channel 21 is used, through which direct charging is performed on the battery 30. When the communication control circuit 23 controls switch transistor $Q_5$ to be switched off, the second charging channel 24 is used, through which the battery 30 is charged.

In another example, the second charging channel 24 can be provided with a circuit or component for decreasing voltage. When a voltage provided by the power supply device is higher than a voltage required by the battery 30, the voltage provided by the power supply device can be decreased. There is no restriction on the circuit or module provided to the second charging channel 24 in embodiments.

In the following, a wireless charging process will be described with reference to FIG. 11 to FIG. 14.

In a conventional wireless charging technology, a power supply device (such as an adaptor) is generally coupled with a wireless charging apparatus (such as a wireless charging base), and an output power of the power supply device is transmitted to a device to-be-charged via the wireless charging apparatus in a wireless manner (such as an electromagnetic wave) for wireless charging of the device to-be-charged.

In terms of the wireless charging principle, the wireless charging manner mainly includes three types: magnetic coupling (or electromagnetic induction), magnetic resonance, and radio waves. At present, mainstream wireless charging standard includes QI standard, power matters alliance (PMA) standard, and alliance for wireless power (A4WP) standard. Under the QI standard and the PMA standard, wireless charging is performed with magnetic coupling. Under the A4WP standard, wireless charging is performed with magnetic resonance.

A wireless charging manner according to embodiments will be hereinafter introduced in connection with FIG. 11.

Figure 11:
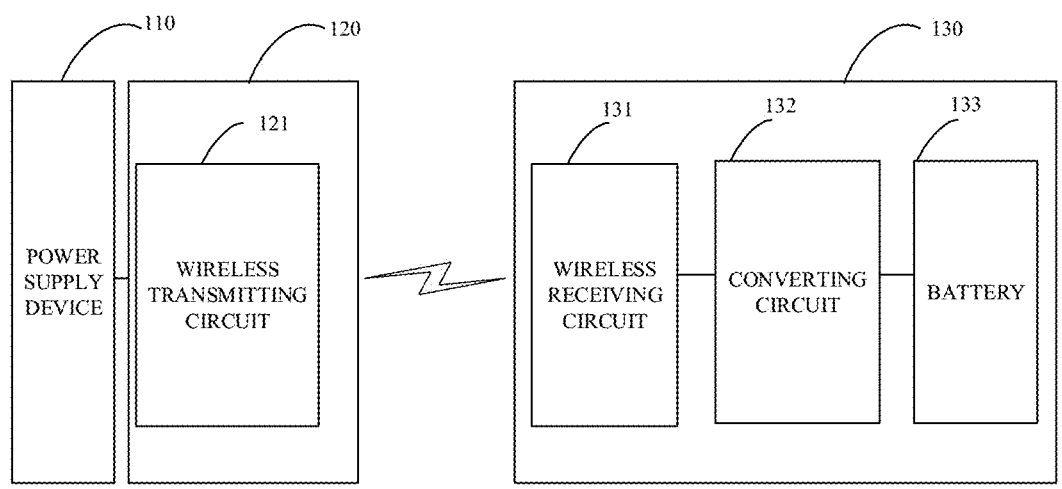
FIG. 11 is a schematic structural diagram of a wireless charging system according to embodiments of the present application.

As illustrated in FIG. 11, a wireless charging system includes a power supply device 110, a wireless-charging-signal transmitting device 120, and a charging control device 130. The transmitting device 120 may be, for example, a wireless charging base. The charging control device 130 may refer to a device to-be-charged, such as a terminal.

After being coupled with the transmitting device 120, the power supply device 110 supplies an output voltage and an output current of the power supply device 110 to the transmitting device 120.

The transmitting device 120 can convert, via an internal wireless transmitting circuit 121, the output voltage and the output current of the power supply device 110 into a wireless charging signal (such as an electromagnetic signal) for transmission. For example, the wireless transmitting circuit 121 can convert the output current of the power supply device 110 into an alternating current (AC) and convert, through a transmitting coil or a transmitting antenna, the AC into the wireless charging signal.

FIG. 11 is merely a schematic structural diagram of a wireless charging system, but embodiments are not limited thereto. For example, the transmitting device 120 can also be referred to as a wireless-charging-signal transmitting device. The charging control device 130 can also be referred to as a wireless-charging-signal receiving device. The wireless-charging-signal receiving device can be, for example, a chip for receiving a wireless charging signal and can receive a wireless charging signal from the transmitting device 120. The wireless-charging-signal receiving device may also be the device to-be-charged.

The charging control device 130 can receive, via a wireless receiving circuit 131, a wireless charging signal from the wireless transmitting circuit 121 and convert the wireless charging signal into an output voltage and an output current of the wireless receiving circuit 131. For example, the wireless receiving circuit 131 can convert, through a receiving coil or a receiving antenna, the wireless charging signal transmitted by the wireless transmitting circuit 121 into an AC and rectify and/or filter the AC to convert the AC into the output voltage and the output current of the wireless receiving circuit 131.

In an example, before wireless charging begins, the transmitting device 120 and the charging control device 130 will negotiate in advance a transmission power of the wireless transmitting circuit 121. In one specific example, the power negotiated between the transmitting device 120 and the charging control device 130 can be 5 W (watt), and the output voltage and the output current of the wireless receiving circuit 131 can respectively be 5V (volt) and 1A (ampere). In another example, the power negotiated between the transmitting device 120 and the charging control device 130 can be 10.8 W, and the output voltage and the output current of the wireless receiving circuit 131 can respectively be 9V and 1.2 A.

If the output voltage of the wireless receiving circuit 131 is not suitable to be directly applied to a battery 133, constant voltage control and/or constant current control needs to be performed on the output voltage of the wireless receiving circuit 131 by a converting circuit 132 of the charging control device 130, to obtain a charging voltage and/or a charging current expected by the battery 133 of the charging control device 130.

The converting circuit 132 can be configured to convert the output voltage of the wireless receiving circuit 131 such that an output voltage and/or an output current of the converting circuit 132 meets requirements on charging voltage and/or charging current of the battery 133.

As an example, the converting circuit 132 can be, for example, a charging IC or a power management circuit. When the battery 133 is charged, the converting circuit 132 is configured to manage a charging voltage and/or a charging current of the battery 133. The converting circuit 132 can have at least one of a voltage feedback function and a current feedback function to achieve management of at least one of the charging voltage and the charging current of the battery 133 respectively.

In a normal charging process, a charging voltage and/or a charging current required by the battery may vary in different charging stages, and accordingly, the output voltage and/or the output current of the wireless receiving circuit needs to be adjusted continuously to meet present charging requirements of the battery. For example, in a constant-current charging stage of the battery, a charging current applied to the battery remains constant during charging, but a voltage across the battery increases continuously. Accordingly, the charging voltage required by the battery increases continuously. As the charging voltage required by the battery increases continuously, a charging power required by the battery increases continuously. When the charging power required by the battery increases, the wireless receiving circuit needs to increase an output power of the wireless receiving circuit to meet charging requirements of the battery.

When the output power of the wireless receiving circuit is lower than a charging power currently required by the battery, a communication control circuit can transmit an instruction to the transmitting device to instruct the transmitting device to increase a transmission power thereof, to increase the output power of the wireless receiving circuit. Therefore, the communication control circuit can communicate with the transmitting device in charging, such that the output power of the wireless receiving circuit meets charging requirements of the battery in different charging stages.

There is no particular restriction on the manner of communication between a communication control circuit and a transmitting device in embodiments. In an example, the communication control circuit can communicate with the transmitting device in a wireless manner. Examples of the wireless manner include Bluetooth, wireless fidelity (Wi-Fi), backscatter modulation (or power load modulation), a near field communication (NFC) based on high carrier frequency, an optical communication, an ultrasonic communication, an ultra-wideband communication, a mobile communication, or the like.

In an example, an NFC module based on high carrier frequency may include an IC chip encapsulated with an extremely high frequency (EHF) antenna. As an example, the high carrier frequency may be 60 GHz.

In an example, the optical communication can be achieved with an optical communication module. The optical communication module may include an infrared communication module. The infrared communication module can transmit information with infrared rays.

In an example, the mobile communication can be achieved with a mobile communication module. The mobile communication module can transmit information based on a fifth generation (5G) communication protocol, a fourth generation (4G) communication protocol, a third generation (3G) communication protocol, etc.

Compared with the QI standard under which communication is achieved by coupling to a coil of the wireless receiving circuit through signal modulation, in the above wireless communication manner, communication can be more reliable. On the other hand, voltage ripple caused by communication through signal coupling, which can affect processing of voltage by a buck circuit, can be avoided.

In an example, the communication control circuit can also communicate with the transmitting device via a data interface in a wired communication manner.

Figure 12:
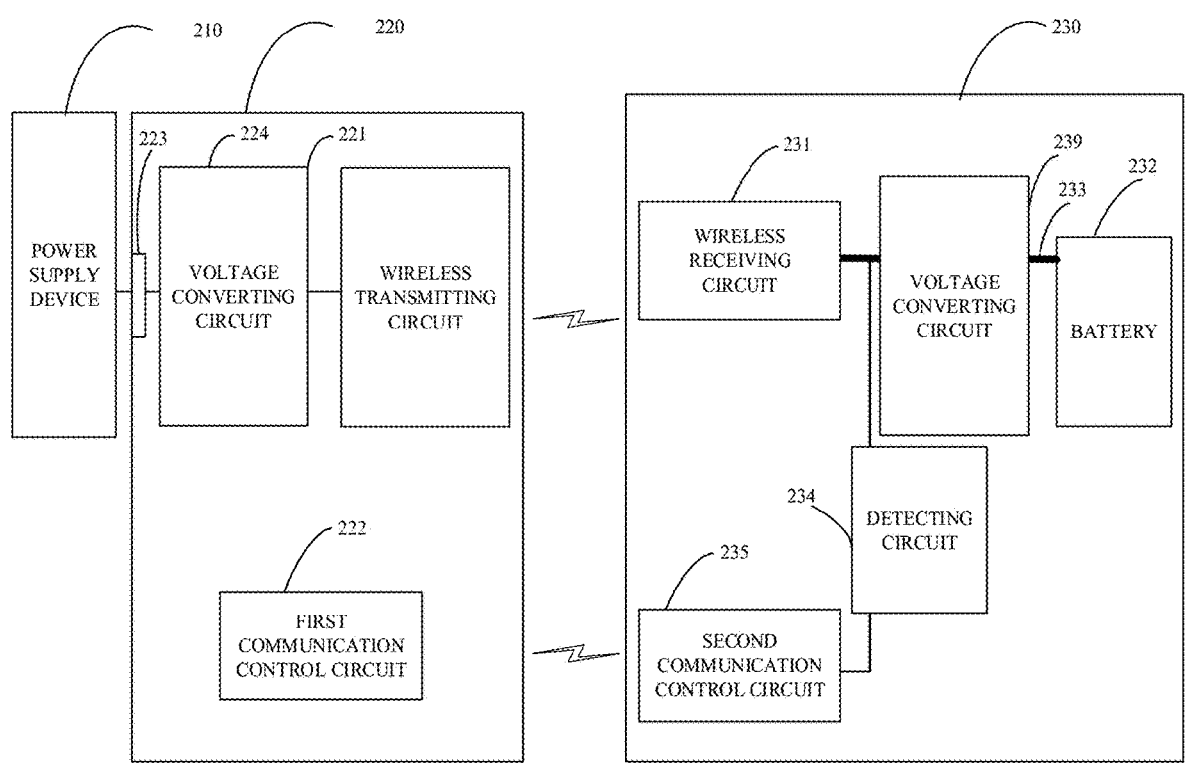
FIG. 12 is a schematic structural diagram of a wireless charging system according to other embodiments of the present application.

FIG. 12 is a schematic diagram of a charging system according to other embodiments. As illustrated in FIG. 12, a wireless-charging-signal transmitting device 220 includes a charging interface 223. The charging interface 223 can be configured to be coupled with an external power supply device 210. A wireless transmitting circuit 221 is further configured to generate a wireless charging signal based on an output voltage and an output current of the power supply device 210.

A first communication control circuit 222 can be further configured to adjust, during wireless charging, an amount of power extracted by the wireless transmitting circuit 221 from an output power of the power supply device 210 to adjust a transmission power of the wireless transmitting circuit 221, such that the transmission power of the wireless transmitting circuit can meet charging requirements of a battery. For example, the power supply device 210 can directly output a constant and high output power (such as 40 W). The first communication control circuit 222 can directly adjust the amount of power extracted by the wireless transmitting circuit 221 from such constant output power of the power supply device 210.

The output power of the power supply device 210 may be constant according to embodiments. For example, the power supply device 210 can directly output a fixed and high output power (such as 40 W) and provide an output voltage and an output current to a wireless charging apparatus 220 according to the constant output power. During charging, the first communication control circuit 222 can extract a certain amount of power from the fixed output power of the power supply device for wireless charging according to actual needs. In other words, according to embodiments, the first communication control circuit 222 is responsible for the adjustment of the transmission power of the wireless transmitting circuit 221. As such, the first communication control circuit 222 can adjust the transmission power of the wireless transmitting circuit 221 immediately after receiving an instruction from a second communication control circuit 235 to meet present charging requirements of the battery, which can advantageously have high adjusting speed and high efficiency.

There is no particular restriction on the manner in which the first communication control circuit 222 extracts a certain amount of power from a maximum output power of the power supply device 210 in embodiments. For example, a voltage converting circuit 224 can be arranged in the wireless-charging-signal transmitting device 220. The voltage converting circuit 224 can be coupled with a transmitting coil or a transmitting antenna to adjust power received by the transmitting coil or the transmitting antenna. The voltage converting circuit 224 can include, for example, a pulse width modulation (PWM) controller and a switch component. The first communication control circuit 222 can adjust the transmission power of the wireless transmitting circuit 221 by adjusting a duty cycle of a control signal transmitted by the PWM controller.

The type of the power supply device 210 is not specifically limited to particular embodiments described herein. For example, the power supply device 210 may be an adaptor, a power bank, an on-board charger, a computer, or the like.

The type of the charging interface 223 is not specifically limited in embodiments. In an example, the charging interface 223 is a universal serial bus (USB) interface. The USB interface can be, for example, a USB 2.0 interface, a micro USB interface, or a USB TYPE-C interface. Alternatively, the charging interface 223 can be a lightning interface, or other types of parallel interface and/or serial interface that is used for charging.

The manner of communication between the first communication control circuit 222 and the power supply device 210 is not limited herein. As an example, the first communication control circuit 222 can be coupled with and communicate with the power supply device 210 via another communication interface other than the charging interface. As another example, the first communication control circuit 222 can communicate with the power supply device 210 in a wireless manner. For example, the first communication control circuit 222 can perform NFC with the power supply device 210. As yet another example, the first communication control circuit 222 can communicate with the power supply device 210 via the charging interface 223 without providing any extra communication interface or another wireless communication module, which can simplify the structure of the wireless charging apparatus 220. For instance, the charging interface 223 can be a USB interface. The first communication control circuit 222 can communicate with the power supply device 210 via a data line (such as a D+ line and/or a D− line) of the USB interface. In another instance, the charging interface 223 is a USB interface supporting a power delivery (PD) communication protocol (such as the USB TYPE-C interface). The first communication control circuit 222 can communicate with the power supply device 210 based on the PD communication protocol.

In an example, the phrase "the first communication control circuit 222 adjusts a transmission power of the wireless charging signal" can include the following. The first communication control circuit 222 can adjust the transmission power of the wireless charging signal by adjusting an input voltage and/or an input current of the wireless transmitting circuit 221. For example, the first communication control circuit increases the transmission power of the wireless transmitting circuit by increasing the input voltage of the wireless transmitting circuit.

Figure 14:
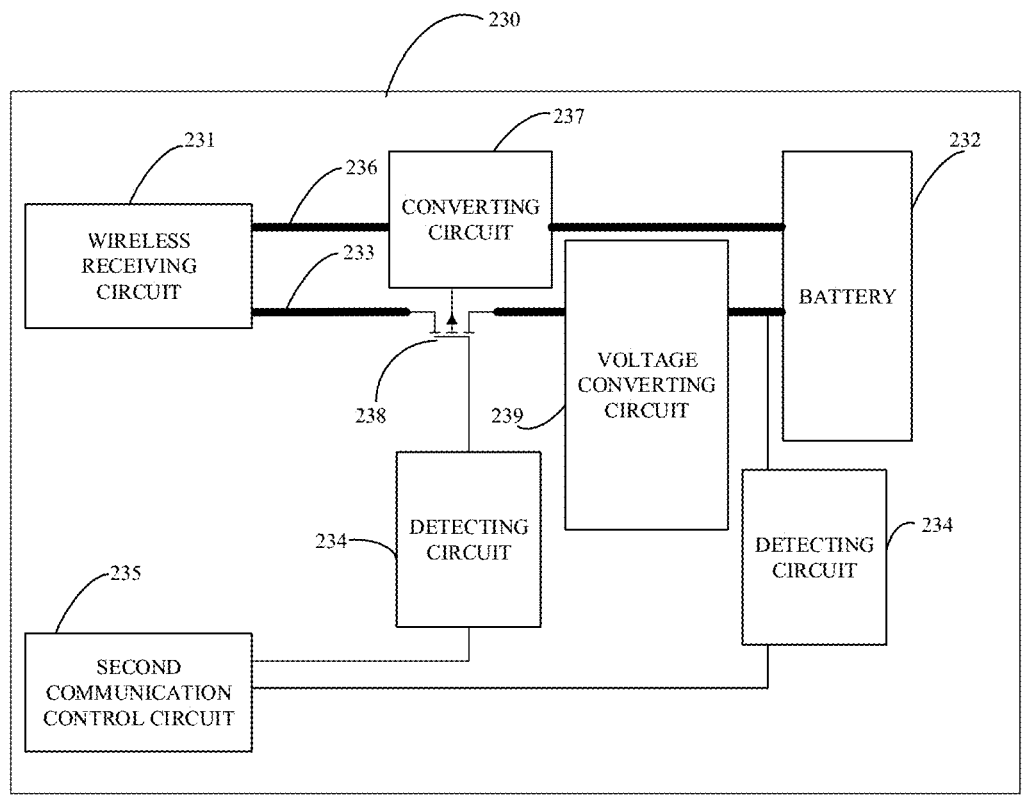
FIG. 14 is a schematic structural diagram of a wireless charging system according to other embodiments of the present application.

In an example illustrated in FIG. 14, a device to-be-charged 230 further includes a first charging channel 233. Through the first charging channel 233, an output voltage and/or an output current of a wireless receiving circuit 231 can be applied to a battery 232 for charging.

In an example, the first charging channel 233 is provided with a voltage converting circuit 239. The voltage converting circuit 239 has an input end electrically coupled with an output end of the wireless receiving circuit 231 and is configured to perform constant-voltage and/or constant-current control on the output voltage of the wireless receiving circuit 231 to be applied to the battery 232 for charging, such that an output voltage and/or an output current of the voltage converting circuit 239 matches a charging voltage and/or a charging current currently required by the battery.

In an example, the phrase "increase the transmission power of the wireless transmitting circuit 221" may refer to increasing a transmission voltage of the wireless transmitting circuit 221. The transmission voltage of the wireless transmitting circuit 221 can be increased by increasing an output voltage of the voltage converting circuit 224. For example, upon receiving from the second communication control circuit 235 an instruction for increasing the transmission power of the wireless transmitting circuit 221, the first communication control circuit 222 can increase the transmission power by increasing the output voltage of the voltage converting circuit 224.

The manner in which the second communication control circuit 235 sends an instruction to the first communication control circuit 222 is not restricted in embodiments.

For example, the second communication control circuit 235 can send an instruction to the first communication control circuit 222 periodically. Alternatively, the second communication control circuit 235 can send an instruction to the first communication control circuit 222 only when a voltage of the battery reaches a charging cut-off voltage or a charging current applied to the battery reaches a charging cut-off current.

In an example, the wireless-charging-signal receiving device further includes a detecting circuit 234. The detecting circuit 234 can detect a voltage of the battery 232 and/or a charging current applied to the battery 232. The second communication control circuit 235 can send an instruction to the first communication control circuit 222 according to the voltage of the battery 232 and/or the charging current applied to the battery 232 to instruct the first communication control circuit 222 to adjust an output voltage and an output current corresponding to the transmission power of the wireless transmitting circuit 221.

For the device to-be-charged, during constant-current charging, the voltage of the battery can increase continuously, and a charging power required by the battery can increase accordingly. In this case, the transmission power of the wireless charging signal needs to be increased to meet present charging requirements of the battery. During constant-voltage charging, the charging current applied to the battery may decrease continuously, and the charging power required by the battery decreases accordingly. In this case, the transmission power of the wireless charging signal needs to be decreased to meet present charging requirements of the battery.

The expression "the first communication control circuit 222 adjusts the transmission power of the wireless charging signal according to the instruction" can mean that the first communication control circuit 222 adjusts the transmission power of the wireless charging signal such that the transmission power of the wireless charging signal matches a charging voltage and/or a charging current currently required by the battery.

The expression "the transmission power of the wireless transmitting circuit 221 matches the charging voltage and/or the charging current currently required by the battery 232" can mean that the transmission power of the wireless charging signal is configured by the first communication control circuit 222 such that an output voltage and/or an output current of the first charging channel 233 matches the charging voltage and/or the charging current currently required by the battery 232, or the transmission power of the wireless charging signal is configured by the first communication control circuit 222 such that the output voltage and/or the output current of the first charging channel 233 meets charging requirements of the battery 232 (including requirements on charging voltage and/or charging current of the battery 232).

It should be understood that, in an example, the expression "the output voltage and/or the output current of the first charging channel 233 matches the charging voltage and/or the charging current currently required by the battery 232" can include the following. A voltage value and/or a current value of an output direct current (DC) of the first charging channel 233 is equal to a charging voltage value and/or a charging current value required by the battery 232 or the difference therebetween is within a preset range (for example, the voltage value is 100 mV (millivolt)~200 mV higher or lower than the charging voltage value, the current value is 0.001 A~0.005 A larger or smaller than the charging current value, etc.).

The second communication control circuit 235 communicates wirelessly with the first communication control circuit 222 according to the voltage of the battery 232 and/or the charging current applied to the battery 232 detected by the detecting circuit 234, so that the first communication control circuit 222 adjusts the transmission power of the wireless transmitting circuit 221 according to the voltage of the battery 232 and/or the charging current applied to the battery 232 as follows. In a constant-current charging stage of the battery 232, the second communication control circuit 235 communicates wirelessly with the first communication control circuit 222 according to the voltage of the battery detected, so that the first communication control circuit 222 adjusts the transmission power of the wireless transmitting circuit 221 such that the output voltage of the first charging channel 233 matches a charging voltage required by the battery in the constant-current charging stage (or the output voltage of the first charging channel 233 meets requirements on charging voltage of the battery 232 in the constant-current charging stage).

Figure 13:
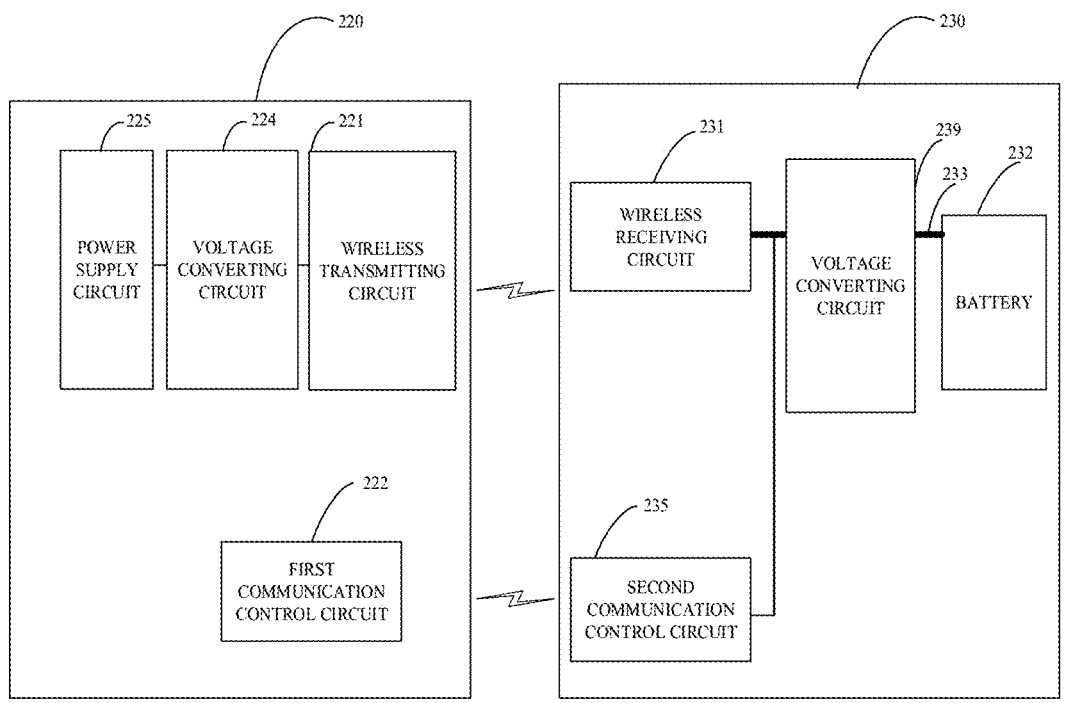
FIG. 13 is a schematic structural diagram of a wireless charging system according to other embodiments of the present application.

FIG. 13 is a schematic structural diagram of a charging system according to other embodiments. The wireless-charging-signal transmitting device 220 illustrated in FIG. 13 does not acquire electrical energy from the power supply device 210. Instead, the wireless-charging-signal transmitting device 220 converts an external AC (such as mains electricity) directly into the wireless charging signal.

As illustrated in FIG. 13, the wireless-charging-signal transmitting device 220 further includes the voltage converting circuit 224 and a power supply circuit 225. The power supply circuit 225 can be configured to receive an external AC (such as mains electricity) and generate an output voltage and an output current of the power supply circuit 225 according to the AC. For example, the power supply circuit 225 can rectify and/or filter the AC to obtain a DC or a pulsating DC to be transmitted to the voltage converting circuit 224.

The voltage converting circuit 224 can be configured to receive the output voltage of the power supply circuit 225 and convert the output voltage of the power supply circuit 225 to obtain an output voltage and an output current of the voltage converting circuit 224. The wireless transmitting circuit 221 can be further configured to generate a wireless charging signal according to the output voltage and the output current of the voltage converting circuit 224.

According to embodiments, the wireless-charging-signal transmitting device 220 is integrated with a function similar to an adaptor, which makes it unnecessary for the wireless-charging-signal transmitting device 220 to acquire power from an external power supply device, thus improves the integration of the wireless-charging-signal transmitting device 220, and decreases the number of components needed for wireless charging.

In an example, the wireless-charging-signal transmitting device 220 is operable in a first wireless charging mode or in a second wireless charging mode, where a charging speed at which the wireless-charging-signal transmitting device 220 charges the device to-be-charged in the first wireless charging mode is higher than that in the second wireless charging mode. In other words, compared with the wireless-charging-signal transmitting device 220 working in the second wireless charging mode, the wireless-charging-signal transmitting device 220 working in the first wireless charging mode takes less time to fully charge a battery of the same capacity of the device to-be-charged.

In the charging method described in the foregoing embodiments, any one of the first wireless charging mode and the second wireless charging can be enabled for charging, and this disclosure is not limited in this regard.

The second wireless charging mode can be referred to as a normal wireless charging mode and can be, for example, a conventional wireless charging mode based on the QI standard, the PMA standard, or the A4WP standard. The first wireless charging mode can be referred to as a quick wireless charging mode. The normal wireless charging mode can refer to a wireless charging mode in which the wireless-charging-signal transmitting device 220 has a low transmission power (e.g. lower than 15 W, and the commonly used transmission power can be 5 W or 10 W). In the normal wireless charging mode, it usually takes several hours to fully charge a battery of high capacity (such as 3000 mA). However, in the quick wireless charging mode, the transmission power of the wireless-charging-signal transmitting device 220 is relatively high (usually higher than or equal to 15 W). Compared with the normal wireless charging mode, in the quick wireless charging mode, the wireless-charging-signal transmitting device 220 can be charged considerably faster such that a battery of the same capacity is fully charged within a substantially shorter charging period.

As illustrated in FIG. 14, the device to-be-charged 230 further includes a second charging channel 236. The second charging channel 236 may be a wire. The second charging channel 236 can be provided with a converting circuit 237. The converting circuit 237 is configured to perform voltage control on a DC outputted by the wireless receiving circuit 231 to obtain an output voltage and an output current of the second charging channel 236 to be applied to the battery 232 for charging.

In an example, the converting circuit 237 may be a buck circuit and can generate electrical energy of constant current and/or constant voltage. In other words, the converting circuit 237 can be configured to perform constant-voltage and/or constant-current control on charging of the battery.

When the battery 232 is charged through the second charging channel 236, the wireless transmitting circuit 221 can transmit an electromagnetic signal at a constant transmission power. After the wireless receiving circuit 231 receives the electromagnetic signal, the converting circuit 237 converts the electromagnetic signal into a voltage and a current which meet charging requirements of the battery 232, and such voltage and current subjected to conversion are applied to the battery 232 for charging. It should be understood that, the "constant transmission power" does not mean that the transmission power remains completely constant, and instead, the transmission power can vary within a certain range, for example, the transmission power is 0~0.5 W higher or lower than 7.5 W.

According to embodiments, a charging manner in which the battery 232 is charged through the first charging channel 233 is referred to as the first wireless charging mode, and a charging manner in which the battery 232 is charged through the second charging channel 236 is referred to as the second wireless charging mode. The wireless-charging-signal transmitting device and the device to-be-charged can determine, through handshake communication, whether to enable the first wireless charging mode or the second wireless charging mode to charge the battery 232.

For the wireless-charging-signal transmitting device, when the device to-be-charged is charged in the first wireless charging mode, a maximum transmission power of the wireless transmitting circuit 221 may be a first transmission power value; when the device to-be-charged is charged in the second wireless charging mode, the maximum transmission power of the wireless transmitting circuit 221 may be a second transmission power value, where the first transmission power value is greater than the second transmission power value. Therefore, a charging speed at which the device to-be-charged is charged in the first wireless charging mode is higher than that in the second wireless charging mode.

The second communication control circuit 235 can be further configured to control switching between the first charging channel 233 and the second charging channel 236. For example, as illustrated in FIG. 14, the first charging channel 233 is provided with a switch 238. The second communication control circuit 235 can control the switch 238 to be switched on or switched off to control switching between the first charging channel 233 and the second charging channel 236. As pointed above, in an example, the wireless-charging-signal transmitting device 220 is operable in the first wireless charging mode or in the second wireless charging mode, where a charging speed at which the wireless-charging-signal transmitting device 220 charges the device to-be-charged 230 in the first wireless charging mode is higher than that in the second wireless charging mode. When the wireless-charging-signal transmitting device 220 is operable in the first wireless charging mode to charge a battery of the device to-be-charged 230, the device to-be-charged 230 controls the first charging channel 233 to work. When the wireless-charging-signal transmitting device 220 is operable in the second wireless charging mode to charge the battery of the device to-be-charged 230, the device to-be-charged 230 controls the second charging channel 236 to work.

In the device to-be-charged, the second communication control circuit 235 can control switching between the first charging channel 233 and the second charging channel 236 according to the charging mode enabled. When the first wireless charging mode is enabled, the second communication control circuit 235 controls the voltage converting circuit 239 on the first charging channel 233 to work. When the second wireless charging mode is enabled, the second communication control circuit 235 controls the converting circuit 237 on the second charging channel 236 to work.

The wireless-charging-signal transmitting device 220 can communicate with the device to-be-charged 230 to negotiate which charging mode to be enabled between the wireless-charging-signal transmitting device 220 and the device to-be-charged 230.

Besides the above-mentioned content communicated between the first communication control circuit 222 of the wireless-charging-signal transmitting device 220 and the second communication control circuit 235 of the device to-be-charged 230, the first communication control circuit 222 and the second communication control circuit 235 can also communicate other information. In an example, the first communication control circuit 222 and the second communication control circuit 235 can communicate information for safety protection, abnormality detection, or failure handling, such as temperature information of the battery 232, information indicative of over-voltage protection or over-current protection, power-delivery efficiency information (indicative of efficiency in power delivery between the wireless transmitting circuit 221 and the wireless receiving circuit 231).

In an example, communication between the second communication control circuit 235 and the first communication control circuit 222 may be a one-way communication or a two-way communication, and this disclosure is not limited in this regard.

According to embodiments, the second communication control circuit can be implemented by an application processor of the device to-be-charged 230, which is possible to save hardware cost. Alternatively, the second communication control circuit can be implemented by an independent control chip, which makes control more reliable.

In an example, the wireless receiving circuit 232 and the voltage converting circuit 239 can be integrated into one wireless charging chip, which can make it possible to improve integration of the device to-be-charged and thereby simplify the structure of the device to-be-charged. For example, a function of a conventional wireless charging chip can be extended, such that the conventional wireless charging chip can support a charging management function.

All or part of the above embodiments can be implemented through software, hardware, firmware, or any other combination thereof. When implemented by software, all or part of the above embodiments can be implemented in the form of a computer program product. The computer program product includes one or more computer instructions. When the computer instructions are applied and executed on a computer, all or part of the operations or functions of the embodiments of the disclosure are performed. The computer can be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

Those of ordinary skill in the art will appreciate that units and algorithmic operations of various examples described in connection with embodiments herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be appreciated that the systems, apparatuses, and methods disclosed in embodiments herein may also be implemented in various other manners. For example, the above apparatus embodiments are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

Various functional units described in embodiments herein may be integrated into one processing unit or may be present as a number of physically separated units, and two or more units may be integrated into one.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A charging method, comprising:
    charging a battery in a constant current stage until a voltage of the battery reaches a first voltage, wherein the first voltage is a charging cut-off voltage corresponding to the constant current stage; and
    in response to the voltage of the battery reaching the first voltage, charging the battery in a constant voltage stage by applying a second voltage to the battery, wherein the second voltage is lower than the first voltage;
    wherein the charging method comprises at least two constant current-constant voltage stages, and each of the at least two constant current-constant voltage stages comprises one constant current stage and one constant voltage stage;
    wherein the at least two constant current-constant voltage stages comprise a first constant current-constant voltage stage and a second constant current-constant voltage stage, the second constant current-constant voltage stage occurs after the first constant current-constant voltage stage, a voltage difference between a charging cut-off voltage corresponding to a constant current stage of the first constant current-constant voltage stage and a charging voltage corresponding to a constant voltage stage of the first constant current-constant voltage stage is $\Delta V_1$, and a voltage difference between a charging cut-off voltage corresponding to a constant current stage of the second constant current-constant voltage stage and a charging voltage corresponding to a constant voltage stage of the second constant current-constant voltage stage is $\Delta V_2$, wherein $\Delta V_1 > \Delta V_2$.

2. The method of claim 1, wherein the at least two constant current-constant voltage stages comprise a first constant current-constant voltage stage and a second constant current-constant voltage stage which are continuous, and a charging current corresponding to a constant current stage of the second constant current-constant voltage stage is equal to a charging cut-off current corresponding to a constant voltage stage of the first constant current-constant voltage stage.

3. The method of claim 1, wherein in the at least two constant current-constant voltage stages, a charging current corresponding to a constant current stage of each of first N constant current-constant voltage stages is equal, wherein N is an integer greater than or equal to two.

4. The method of claim 1, wherein a charging cut-off voltage corresponding to the constant current stage is higher than a rated voltage of the battery.

5. The method of claim 4, wherein the constant current stage is a constant current stage of a last constant current-constant voltage stage in the at least two constant current-constant voltage stages.

6. The method of claim 1, wherein a charging current corresponding to the constant current stage is larger than a rated maximum charging current of the battery.

7. The method of claim 6, wherein the constant current stage is a constant current stage of a first constant current-constant voltage stage in the at least two constant current-constant voltage stages.

8. The method of claim 1, wherein:
    the constant voltage stage is a constant voltage stage of the last constant current-constant voltage stage in the at least two constant current-constant voltage stages;
    the method further comprises one of:
        ending charging in response to a charging current applied to the battery reaching a charging cut-off current corresponding to the constant voltage stage, wherein the charging cut-off current corresponding to the constant voltage stage is determined according to a rated capacity of the battery; or
        ending charging in response to a charging time for the constant voltage stage reaching a preset charging time.

9. A charging method, comprising:
    charging a battery with at least two constant current-constant voltage stages, each of the at least two constant current-constant voltage stages comprising one constant current stage and one constant voltage stage, a charging current corresponding to a constant current stage of each of first N constant current-constant voltage stages being equal, and N being an integer greater than or equal to two;
    wherein the battery is charged in the one constant current stage until a voltage of the battery reaches a first voltage, the first voltage being a charging cut-off voltage corresponding to the constant current stage; and
    wherein in response to the voltage of the battery reaching the first voltage, the battery is charged in the constant voltage stage by applying a second voltage to the battery, the second voltage being lower than or equal to the first voltage;
    wherein constant current-constant voltage stages of the at least two constant current-constant voltage stages other than the first N constant current-constant voltage stages comprise a first constant current-constant voltage stage and a second constant current-constant voltage stage which are continuous, and a charging current corresponding to a constant current stage of the second constant current-constant voltage stage is equal to a charging cut-off current corresponding to a constant voltage stage of the first constant current-constant voltage stage.

10. A charging apparatus comprising:
    a charging management circuit configured to:

charge a battery in a constant current stage until a voltage of the battery reaches a first voltage, wherein the first voltage is a charging cut-off voltage corresponding to the constant current stage; and in response to the voltage of the battery reaching the first voltage, charge the battery by applying, in a constant voltage stage, a second voltage to the battery, wherein the second voltage is lower than the first voltage;

wherein the charging management circuit is configured to charge the battery in at least two constant current-constant voltage stages, and each of the at least two constant current-constant voltage stages comprises one constant current stage and one constant voltage stage;

wherein the at least two constant current-constant voltage stages comprise a first constant current-constant voltage stage and a second constant current-constant voltage stage, the second constant current-constant voltage stage occurs after than the first constant current-constant voltage stage, a voltage difference between a charging cut-off voltage corresponding to a constant current stage of the first constant current-constant voltage stage and a charging voltage corresponding to a constant voltage stage of the first constant current-constant voltage stage is $\Delta V_1$, and a voltage difference between a charging cut-off voltage corresponding to a constant current stage of the second constant current-constant voltage stage and a charging voltage corresponding to a constant voltage stage of the second constant current-constant voltage stage is $\Delta V_2$ wherein $\Delta V_1 > \Delta V_2$.

11. The charging apparatus of claim 10, wherein the at least two constant current-constant voltage stages comprise a first constant current-constant voltage stage and a second constant current-constant voltage stage which are continuous, and a charging current corresponding to a constant current stage of the second constant current-constant voltage stage is equal to a charging cut-off current corresponding to a constant voltage stage of the first constant current-constant voltage stage.

12. The charging apparatus of claim 10, wherein in the at least two constant current-constant voltage stages, a charging current corresponding to a constant current stage of each of first N constant current-constant voltage stages is equal, wherein N is an integer greater than or equal to two.

13. The charging apparatus of claim 10, wherein a charging cut-off voltage corresponding to the constant current stage is higher than a rated voltage of the battery.

14. The charging apparatus of claim 13, wherein the constant current stage is a constant current stage of a last constant current-constant voltage stage in the at least two constant current-constant voltage stages.

15. The charging apparatus of claim 10, wherein a charging current corresponding to the constant current stage is larger than a rated maximum charging current of the battery.

* * * * *